United States Patent
Green et al.

(10) Patent No.: US 9,413,149 B1
(45) Date of Patent: Aug. 9, 2016

(54) ELECTRICAL BOX VOLTAGE DIVIDER

(71) Applicants: Russell Bryant Green, Douglasville, GA (US); Terence JaMal Clarke, Roswell, GA (US)

(72) Inventors: Russell Bryant Green, Douglasville, GA (US); Terence JaMal Clarke, Roswell, GA (US)

(73) Assignee: Cooper Technologies Company, Houston, TX (US)

( * ) Notice: Subject to any disclaimer, the term of this patent is extended or adjusted under 35 U.S.C. 154(b) by 539 days.

(21) Appl. No.: 13/886,833

(22) Filed: May 3, 2013

Related U.S. Application Data

(62) Division of application No. 12/714,969, filed on Mar. 1, 2010, now Pat. No. 8,436,259.

(51) Int. Cl.
*H05K 5/00* (2006.01)
*H02G 3/08* (2006.01)

(52) U.S. Cl.
CPC ...................................... *H02G 3/08* (2013.01)

(58) Field of Classification Search
CPC ....... H02G 3/086; H02G 3/081; H02G 3/185; H02G 3/085; H02G 3/08; H05K 5/00; H05K 5/04; H01L 2224/16
See application file for complete search history.

(56) References Cited

U.S. PATENT DOCUMENTS

| | | | |
|---|---|---|---|
| 5,594,207 A | 1/1997 | Fabian et al. | |
| 6,274,809 B1 * | 8/2001 | Pudims | H02G 3/185 174/486 |
| 6,395,979 B1 * | 5/2002 | English | H02G 3/081 174/50 |
| 7,157,643 B2 * | 1/2007 | Drane | H02G 3/185 174/66 |
| 7,968,806 B2 | 6/2011 | Shelton et al. | |
| 2011/0230075 A1 * | 9/2011 | Van Beveren | H02G 3/00 439/345 |

* cited by examiner

*Primary Examiner* — Robert J Hoffberg
*Assistant Examiner* — Hung Dang
(74) *Attorney, Agent, or Firm* — King & Spalding LLP

(57) ABSTRACT

An electrical box that allows for separate wire connection areas for low voltage and line voltage wiring within a single box. The electrical box includes a voltage divider positioned within the box that divides the box into two portions, providing a low voltage wiring connection area that is separate from the line voltage wiring connection area. The electrical box also includes multiple knockouts, each covering an opening that provides a passageway from the interior of the box to the exterior of the box. At least one knockout and associated opening are positioned to provide access to the low voltage wiring connection area and another knockout and associate opening is positioned along to the box to provide access to the line voltage wiring connection area. The box provides an electrical junction for a luminaire, such as a downlight, or other electrical device.

16 Claims, 4 Drawing Sheets

ELECTRICAL BOX VOLTAGE DIVIDER

PRIORITY CLAIM

This application claims priority to and is a divisional application of U.S. patent application Ser. No. 12/714,969, entitled "Electrical Box Voltage Divider," filed Mar. 1, 2010, the complete disclosure of which is hereby fully incorporated herein by reference.

TECHNICAL FIELD

The present application relates generally to an electrical box, enclosure, or receptacle. More specifically, the application relates to an electrical box, enclosure, or receptacle configured to separate low voltage control wiring and line voltage wiring.

BACKGROUND OF THE INVENTION

Electrical boxes are used to allow installers to install lighting fixtures in buildings pre-wired for low voltage and line voltage wiring. The electrical box is coupled to a lighting fixture having low voltage dimming capabilities. Typically, low voltage and line voltage wiring extends from the lighting fixture into the interior of the electrical box by way of a flexible electrical conduit. In many cases, terminal connections of the low voltage and line voltage wiring (present within the electrical box) are electrically coupled to a dimmer switch and a load source, respectively, to complete installation of the lighting fixture.

The presence of low voltage and line voltage wiring within a single enclosure can result in a hazardous condition in the event that the terminal connections of the low voltage and line voltage wiring are in close proximity to one another or physically contact each other. In order to comply with standard electrical codes and maintain a separation between the terminal connections of the low voltage and line voltage wiring, installers may use multiple electrical boxes to separately house low voltage and line voltage wiring. However, the use of multiple electrical boxes is undesirable, as it is costly and results in too much space being needed.

SUMMARY OF THE INVENTION

Electrical boxes and systems described herein allow separation of circuits between low voltage wiring and line voltage wiring. In one aspect, an electrical box of the present invention can include four side walls defining an enclosure and arranged in a rectangular shape to form an interior space within the enclosure, and a voltage divider positioned within the interior space of the enclosure. The voltage divider can be positioned within a single quadrant of the interior space to define a separate space within the interior space. The shape of the space can be rectangular, triangular, have a curved portion, or be asymmetrically-shaped. At least one of the side walls of the enclosure can include at least one knockout. The knockout can provide a passageway from an exterior of the electrical box to the interior space and/or the space defined by the voltage divider and the enclosure. The voltage divider can also include at least one opening that allows a passageway between the interior space and the space defined by the voltage divider and the enclosure.

In another aspect, a system is defined that includes an electrical box of the present invention having low voltage and line voltage wiring therein. The low voltage and line voltage wiring can be positioned at least partially within the interior space of the enclosure. At least a portion of the low voltage wiring can extend from the interior space, through the opening in the voltage divider, and into the space defined by the voltage divider and the enclosure. In some aspects, the system includes multiple electrical boxes. The line voltage wiring extends from the interior space of one electrical box into the interior space of another electrical box via knockouts present along an exterior of each electrical box.

In yet another aspect of the present invention, a voltage divider can include an attachment wall having a first opening sized substantially similar to a knockout of an electrical box, and at least one wire receiving wall having a second opening for receiving low voltage wiring. The voltage divider can include two wire receiving walls coupled to each other. The wire receiving wall can be curved, flat, or asymmetrically-shaped.

These and other aspects, objects, and features of the invention will become apparent to those having ordinary skill in the art upon consideration of the following detailed description of exemplary embodiments exemplifying the best mode for carrying out the invention as presently perceived.

DETAILED DESCRIPTION OF EXEMPLARY EMBODIMENTS

Figure 1:
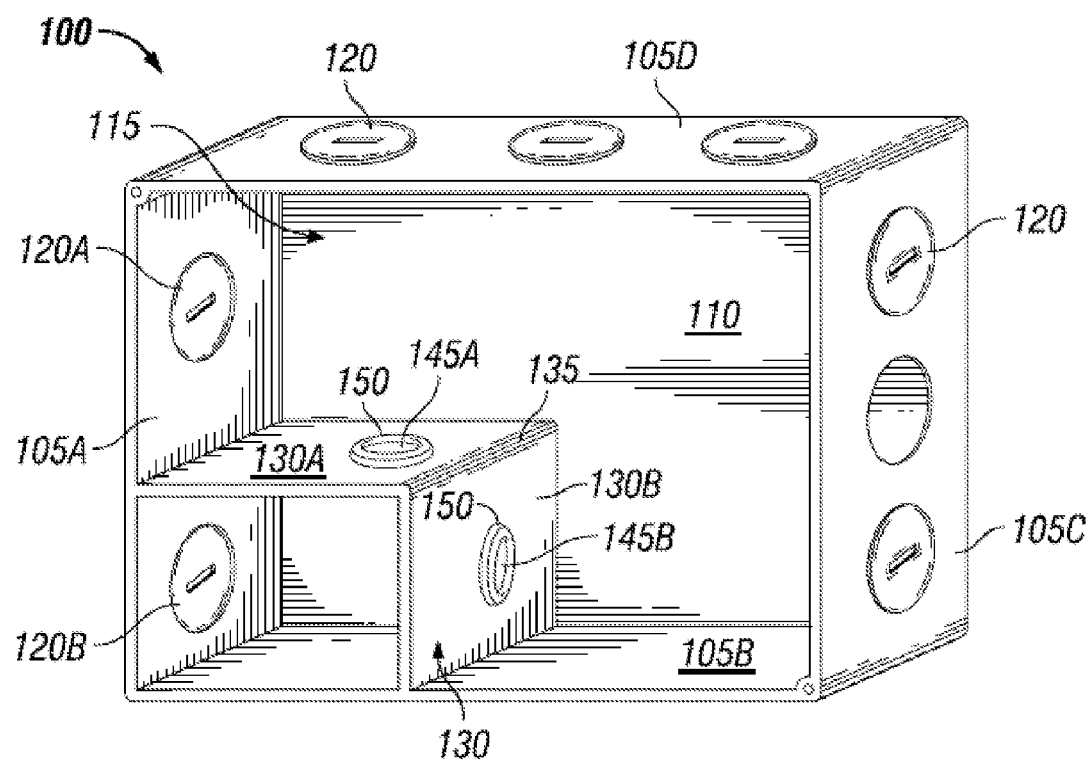
FIG. 1 is a perspective view of an electrical box, showing an interior thereof, according to an exemplary embodiment.

The invention may be better understood by reading the following description of non-limiting, exemplary embodiments with reference to the attached drawings wherein like parts of each of the figures are identified by the same reference characters.

The exemplary electrical enclosure, receptacle, housing, or box can be made of metal (for example, steel), plastic (for example, PVC), or other material, and can provide a structure for housing an electrical connection. The exemplary embodiments describe a box, but the box is not intended to be limited only to a box for housing low voltage and line voltage wiring. Although the exemplary embodiments describe a box, the box can be any configuration of box, including those boxes having a removable back or cover (also known as an "open back" box) or those boxes having a fixed back. For example, in one exemplary embodiment, the back panel of the open back box is attached using screws or other suitable fasteners. In an alternative exemplary embodiment, the back panel of the box is attached by inserting protrusions of the back panel into corresponding apertures in the box.

Referring to FIG. 1, a perspective view of an electrical box 100 is shown. The box 100 includes four side walls 105a, 105b, 105c, 105d, collectively referred to as side walls 105, arranged in a rectangular shape. The box 100 also includes a fixed back wall 110 that is coupled to and disposed orthogonally to the side walls 105. The side walls 105 and the back wall 110 define a cavity 115 of the box 100. In one exemplary embodiment, a front side of the box 100 remains open to allow access to the cavity 115. Also, in certain exemplary embodiments, a cover (not shown) is removably coupled to the front side of the box 100 to close off the box and prevent access to any components (not shown) housed therein. The side walls 105 include one or more knockouts 120. The knockouts 120 are partially stamped openings that can be removed to allow quick entry of a wire, cable, or pipe into the interior of the electrical box 100. It is understood that knockouts 120 can be configured along side walls 105 to provide access to the interior of box 100, but knockouts 120 are not intended to be limited to any particular configuration.

The box 100 also includes a voltage divider 130 positioned in a lower quadrant of the cavity 115. The voltage divider 130 includes a top wall 130a and a side wall 130b. In one exemplary embodiment the top wall 130a is orthogonal to or substantially orthogonal to the side wall 130b at an intersection 135 of the top wall 130a and the side wall 130b. In one exemplary embodiment, the top wall 130a is coupled to the side wall 105a at a position such that at least one knockout 120a remains between the top wall 130a and the side wall 105d of the box 100, and at least one knockout 120b remains between the top wall 130a and the side wall 105b of the box 100. In certain exemplary embodiments, the side wall 105a includes only one knockout 120b that remains between the top wall 130a and the side wall 105b of the box 100. In certain exemplary embodiments, the side wall 130b is coupled to the side wall 105b at a position about midway along the length of the side wall 105b. In certain exemplary embodiments, the voltage divider 130 is integral to the side walls 105a, 105b. In alternative embodiments, the voltage divider 130 includes flanges (not shown) extending orthogonally from the top wall 130a and the side wall 130b, respectively. The flanges or the side walls 130a, 130b themselves are secured to the box 100 by any means known to one having ordinary skill in the art, including, but not limited to, screws, adhesives, and welding.

The top wall 130a of the voltage divider 130 includes an opening 145a, and the side wall 130b includes an opening 145b. The openings 145a, 145b provide a passageway between the interior of the voltage divider 130 and the interior 115 of the box 100, and are configured to receive wiring (not shown) therethrough. In certain exemplary embodiments, the openings 145a, 145b are circular and can accommodate up to two wires. In alternative embodiments, the shape of the openings 145a, 145b are triangular, rectangular, pentagonal, hexagonal, and the like. In other embodiments, the openings 145a, 145b are asymmetrically-shaped. The openings 145a, 145b may be configured in any shape so long as the openings 145a, 145b are sized appropriately to accommodate wiring for low voltage dimming applications, or other desired applications. In certain exemplary embodiments, grommets 150 are inserted into the openings 145a, 145b, to reinforce the openings 145a, 145b and/or shield wiring (not shown) from the sharp edges of the openings 145a, 145b. In certain embodiments, the grommets 150 are constructed from plastic. In certain other embodiments, the grommets 150 are constructed from rubber.

In certain exemplary embodiments, the voltage divider 130 is constructed of steel or aluminum, and the thickness of the top wall 130a and the side wall 130b is about 0.016 inch. In certain other exemplary embodiments, the voltage divider 130 is constructed of a vulcanized fiber and molded polymeric material, and the thickness of the top wall 130a and the side wall 130b is about 0.028 inch. However, those of ordinary skill in the art will recognize that other thicknesses, both lesser and greater, for both the steel/aluminum embodiment and the vulcanized fiber/molded polymeric embodiment are within the scope of the exemplary embodiments.

Figure 2:
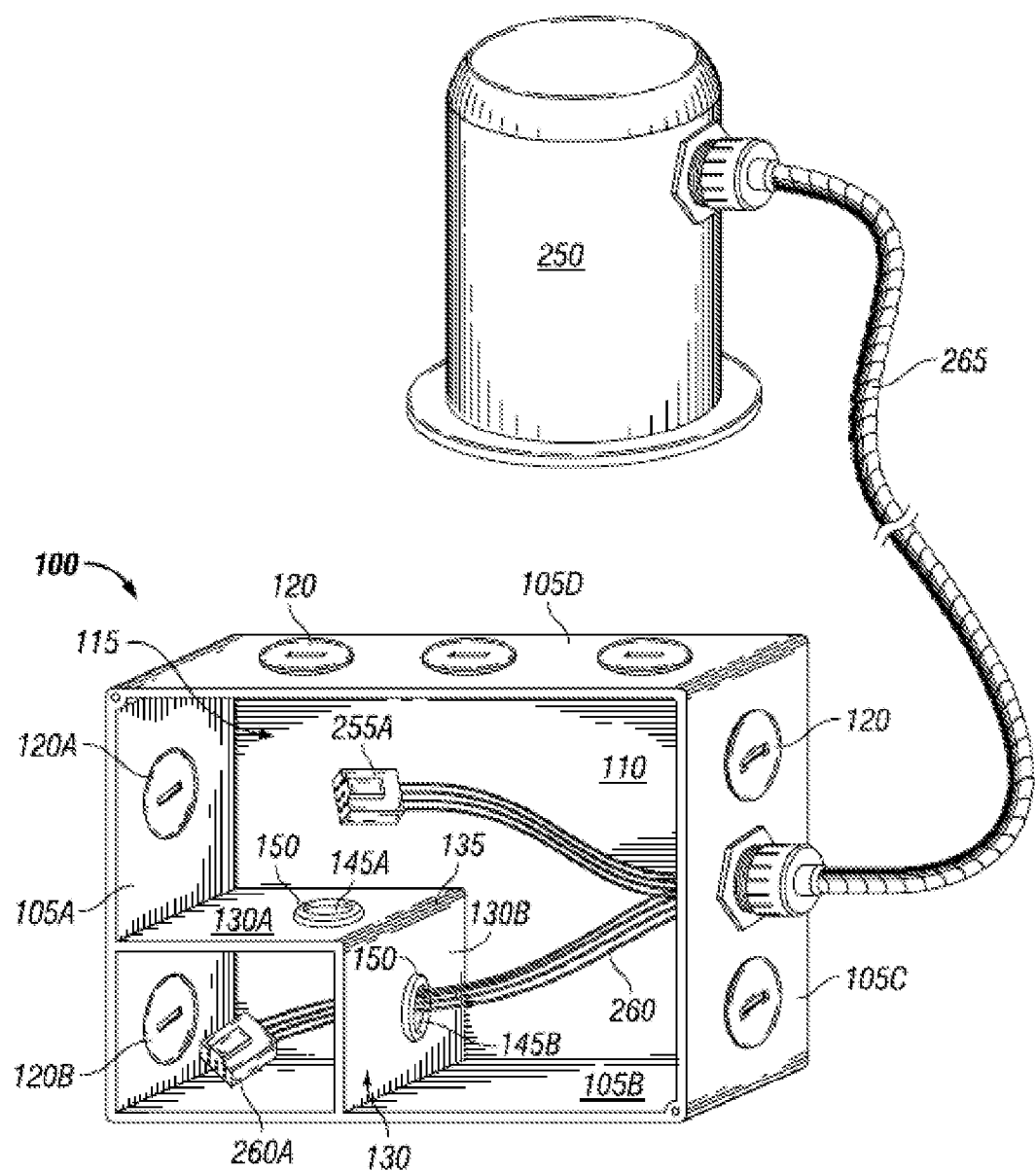
FIG. 2 is a perspective view of the electrical box of FIG. 1 coupled to a lighting fixture, according to an exemplary embodiment.

Referring now to FIG. 2, a perspective view of an electrical box 100 coupled to a lighting fixture 250 is shown. The electrical box 100 is the same as that described above with regard to FIG. 1, except as specifically stated below, and for the sake of brevity will not be repeated herein.

The lighting fixture 250 includes line voltage wiring 255 and low voltage wiring 260 coupled to a ballast (not shown). The line voltage wiring 255 and low voltage wiring 260 extends from the lighting fixture 250 to the box 100 through a flexible electrical conduit 265. The flexible electrical conduit 265 is coupled to the side wall 105c, and provides a pathway for the wiring 255, 260 from the fixture 250 into the cavity 115 of the box 100.

Once inside the cavity 115 of the box 100, the low voltage wiring 260 extends through the opening 145b of the voltage divider 130 and into a space 115a formed by the voltage divider 130 and the side walls 105a, 105b. In alternative embodiments, the low voltage wiring 260 extends through the opening 145a of the voltage divider 130 and into the space 115a. The line voltage wiring 255 remains in the cavity 115 outside of the space 115a, and therefore is separated from the low voltage wiring 260. As a result, separation between the line voltage wiring 255 and the low voltage wiring 260 is maintained for the purposes of connecting each to their respective power sources (either directly or through intermediate connections). The line voltage wiring 255 includes a connector 255a at an end thereof, and can be electrically coupled to a power source (not shown). The low voltage wiring 260 includes a connector 260a at an end thereof, and can be electrically coupled (via intermediate wiring) to a dimmer switch (not shown) or other low voltage system. In certain alternative embodiments, additional line voltage wiring (not shown) can extend through any one of the knockouts 120 of the box 100, and into other electrical boxes (not shown).

When access to the cavity 115 of the box 100 is necessary, a cover (not shown) removably secured to the front side of the box 100 is opened to allow access to the cavity 115. When access to the cavity 115 of the box 100 is no longer necessary or when the fixture 250 is operating, the cover is re-secured to the front side of the box 100 to close off the box 100 and prevent access to the line voltage wiring 255 and the low voltage wiring 260 housed therein.

Figure 3:
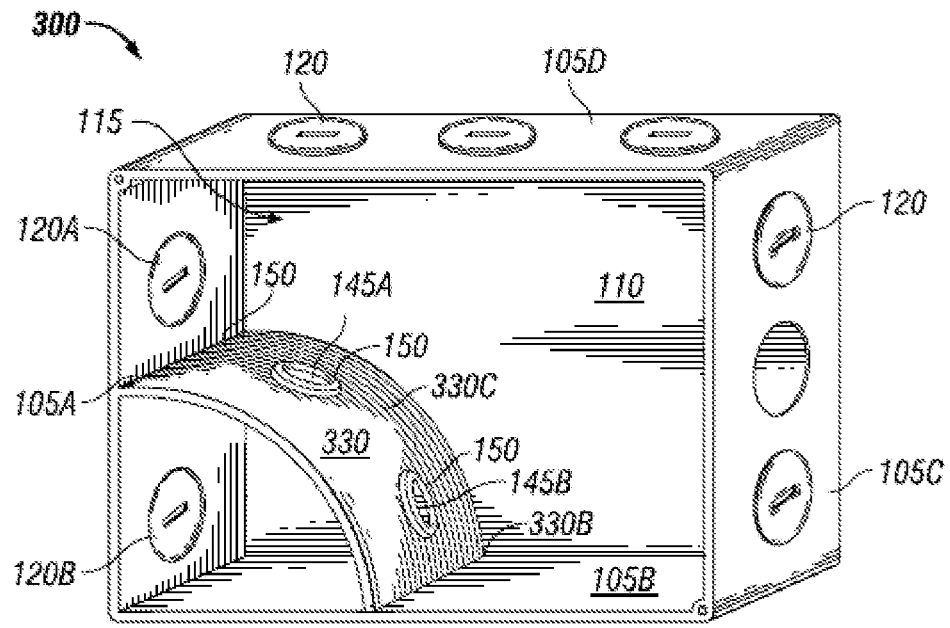
FIG. 3 is a perspective view of another electrical box, showing an interior thereof, according to an alternative exemplary embodiment.

Referring to FIG. 3, a perspective view of an electrical box 300 is shown. The electrical box 300 is the same as that described above with regard to FIG. 1, except as specifically stated below, and for the sake of brevity will not be repeated herein.

The box 300 also includes a voltage divider 330 positioned therein. The voltage divider 330 includes a first end 330a and a second end 330b. The voltage divider 330 also includes a curved portion 330c extending between the first end 330a and the second end 330b. The first end 330a is coupled to the side wall 105a at a position such that at least one knockout 120a remains between the first end 330a and the side wall 105d of the box 300, and at least one knockout 120b remains between the first end 330a and the side wall 105b of the box 300. In certain exemplary embodiments, the side wall 105a includes only one knockout 120b that remains between the first end 330a and the side wall 105b of the box 300. The second end 330b is coupled to the side wall 105b at a position about midway along the length of the side wall 105b. In certain exemplary embodiments, the voltage divider 330 is integral to the side walls 105a, 105b. In alternative embodiments, the voltage divider 330 includes flanges (not shown) extending orthogonally from the first end 330a and the second end 330b, respectively. The flanges or the first end 330a and the second end 330b themselves are secured to the box 300 by any means known to one having ordinary skill in the art, including, but not limited to, screws, adhesives, and welding.

The curved portion 330c of the voltage divider 330 includes circular openings 145a, 145b, for receiving low voltage wiring (not shown) therethrough. In certain alternative embodiments, the curved portion 330c may include only one opening 145a. Any number of openings may be included in the voltage divider 330, as deemed appropriate by one having ordinary skill in the art.

Figure 4:
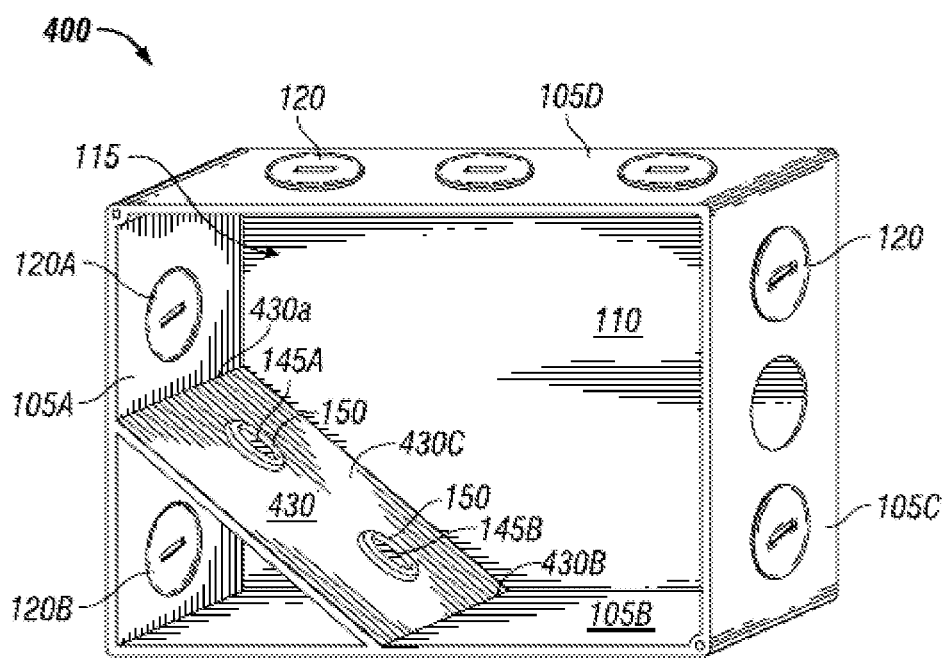
FIG. 4 is a perspective view of yet another electrical box, showing an interior thereof, according to another alternative exemplary embodiment.

Referring to FIG. 4, a perspective view of an electrical box 400 is shown. The electrical box 400 is the same as that described above with regard to FIG. 1, except as specifically stated below, and for the sake of brevity will not be repeated herein.

The box 400 includes a voltage divider 430 positioned therein. The voltage divider 430 includes a first end 430a and a second end 430b. The voltage divider 430 also includes a flat planar portion 430c extending between the first end 430a and the second end 430b and having a width that is equal to or substantially equal to the depth of the box 400. The first end 430a is coupled to the side wall 105a at a position such that at least one knockout 120a remains between the first end 430a and the side wall 105d of the box 400, and at least one knockout 120b remains between the first end 430a and the side wall 105b of the box 400. In certain exemplary embodiments, the side wall 105a includes only one knockout 120b that remains between the first end 430a and the side wall 105b of the box 400. The second end 430b is coupled to the side wall 105b at a position about midway along the length of the side wall 105b. In certain exemplary embodiments, the voltage divider 430 is integral to the side walls 105a, 105b. In alternative embodiments, the voltage divider 430 includes flanges (not shown) extending orthogonally from the first end 430a and the second end 430b, respectively. The flanges or the first end 430a and the second end 430b themselves are secured to the box 400 by any means known to one having ordinary skill in the art, including, but not limited to, screws, adhesives, and welding.

The flat portion 430c of the voltage divider 430 includes circular openings 145a, 145b, for receiving low voltage wiring (not shown) therethrough. However, one of ordinary skill in the art will recognize that any number of openings 145, including a single opening, in the voltage divider 430 is within the scope of the exemplary embodiments based on particular design needs.

Figure 5:
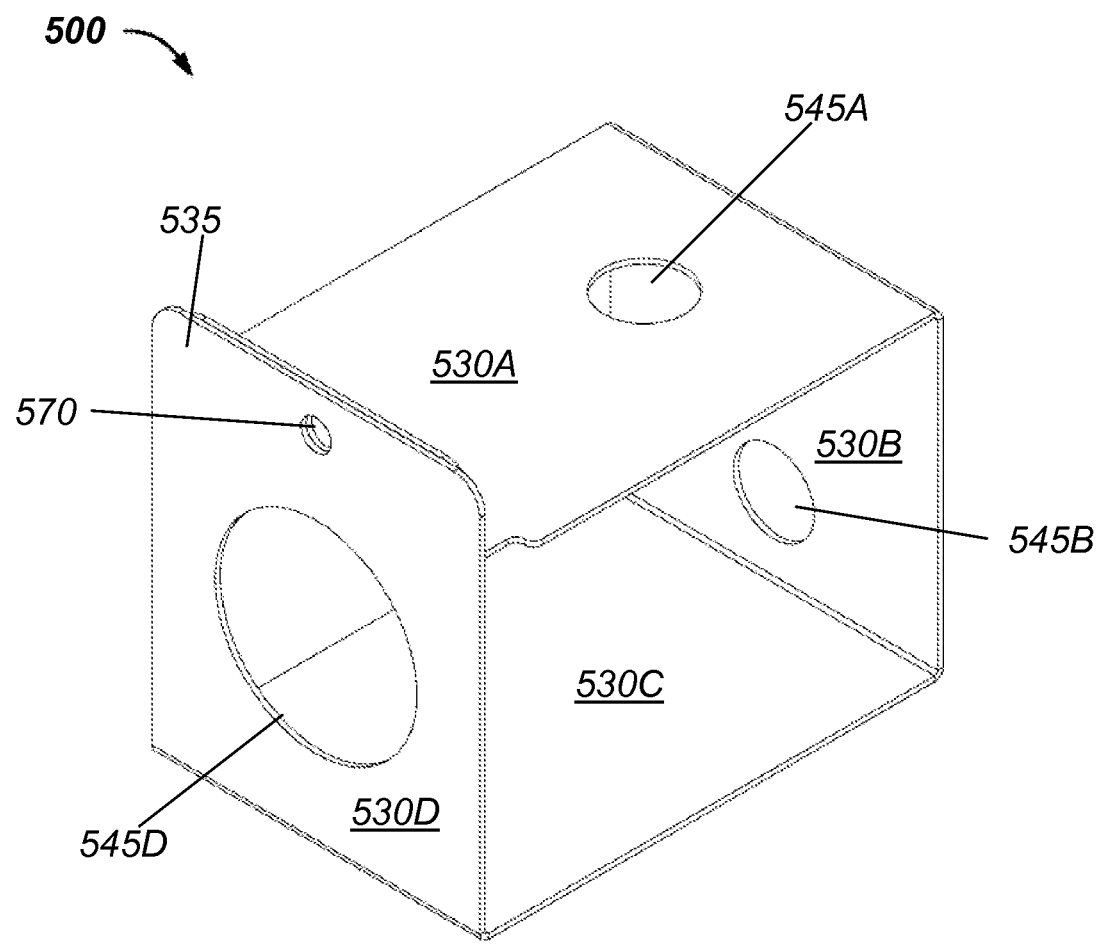
FIG. 5 is a perspective view of a voltage divider for an electrical box, according to an exemplary embodiment.

Referring now to FIG. 5, a perspective view of an exemplary voltage divider 500 for retrofitting into an existing electrical box is shown. The voltage divider 500 includes a top wall 530a, a side wall 530b, an optional base wall 530c, and an attachment wall 530d, collectively referred to as walls 530, arranged in a rectangular shape. Those of ordinary skill in the art will recognize, however, that the alternative voltage dividers of FIGS. 2-4 are modifiable in a similar manner as described with regard to voltage divider 500 of FIG. 5 for other retrofit options. The top wall 530a of the voltage divider 500 includes a circular opening 545a, and the side wall 530b includes a circular opening 545b. The openings 545a, 545b are sized to function as a passageway for wiring (not shown), such as low voltage wiring, from a cavity 115 of a junction box 100 (such as that taught and described in FIG. 1) to the interior of the voltage divider 500. In one exemplary embodiment, the low voltage wiring is used for low voltage dimming applications.

The attachment wall 530d includes a circular opening 545d sized approximately equal to or greater than a knockout (not shown) and generally positioned to line up with the knockout in the existing electrical box when inserted therein. In certain exemplary embodiments, the attachment wall 530d includes a flange 535 extending generally upward past the intersection of the top wall 530a and the attachment wall 530d, where the flange 535 is orthogonal to the top wall 530a. The flange 535 includes an opening 570 configured to receive a screw, or other attachment device.

In one exemplary embodiment, the voltage divider 500 is placed in a corner of the existing electrical box such that the attachment wall 530a is flush against a side wall of the existing electrical box, and the circular opening 545d is aligned with a knockout in the side wall of the existing electrical box. The flange 535 is secured to an interior of the side wall of the existing electrical junction box using an attachment device, such as a screw. Once the voltage divider 500 is placed in the existing electrical box, low voltage wiring (not shown) can be drawn from the electrical box through one of the openings 545a, 545b, and into the space defined by the walls 530. The low voltage wiring can then be electrically connected to an external dimmer switch. The presence of the voltage divider 500 in the existing electrical box allows the user to effectively separate low voltage wiring from line voltage wiring for the purposes of making connections to voltage sources for both therein, and keeping those connections points separate.

In certain exemplary embodiments, the voltage divider 500 is constructed from one of steel, aluminum, vulcanized fiber and molded polymeric material, or the like. In certain embodiments, the voltage divider 500 has a shape other than rectangular. For instance, the shape of the voltage divider 500 in certain alternative embodiments is one of triangular, pentagonal, curved, or asymmetric. One having ordinary skill in the art will recognize that the voltage divider may have any shape suitable for use in an electrical box, while effectively separating connection points between low voltage wiring and line voltage wiring, and allow users to run multiple sets of line voltage wiring through the electrical box to other electrical boxes.

The particular embodiments disclosed herein are illustrative only, as the invention may be modified and practiced in different but equivalent manners apparent to those having ordinary skill in the art and having the benefit of the teachings herein. While numerous changes may be made by those having ordinary skill in the art, such changes are encompassed within the spirit and scope of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention as defined by the claims below. The terms in the claims have their plain, ordinary meaning unless otherwise explicitly and clearly defined by the patentee.

What is claimed is:

1. A separating means for an electrical box having at least one knockout, the separating means comprising:
    an attachment wall, the attachment wall having a first opening sized substantially similar to the at least one knockout;
    at least one wire receiving wall having a second opening;
    a top wall; and
    a bottom wall, wherein the top, bottom, attachment, and wire receiving walls are arranged to form an interior space of the separating means, and wherein the attachment wall of the separating means comprises a flange that extends past a position where the top wall meets the attachment wall.

2. The separating means of claim 1, wherein the top wall has a third opening.

3. The separating means of claim 1, wherein the flange comprises an opening to receive a screw or other means to attach or adjoin the separating means to a wall of the electrical box.

4. An electrical box having at least one knockout, comprising:
   a back panel;
   a plurality of walls each having a first edge that extends out in a substantially orthogonal direction from the back panel;
   a front panel removably disposed along a second opposing edge of each of the walls, the back panel, walls, and front panel defining an interior space; and
   a voltage divider comprising:
      an attachment wall having a first opening sized substantially similar to the at least one knockout;
      at least one wire receiving wall having a second opening;
      a top wall; and
      a bottom wall,
         wherein the top, bottom, attachment, and wire receiving walls are arranged to form an interior space of the voltage divider, and
         wherein the attachment wall of the voltage divider comprises a flange that extends past a position where the top wall meets the attachment wall.

5. The electrical box of claim 4, wherein the attachment wall of the voltage divider is attached or adjoined to one of the walls of the electrical box at a position to align the at least one knockout of the electrical box with the first opening of the voltage divider.

6. The electrical box of claim 4, wherein the voltage divider is formed in a triangular or curved shape.

7. The electrical box of claim 4, wherein the first opening of the voltage divider is sized greater than the at least one knockout of the electrical box.

8. The electrical box of claim 4, wherein the top wall has a third opening.

9. The electrical box of claim 4, wherein the flange comprises an opening to receive a screw or other means to attach or adjoin the voltage divider to the one of the walls of the electrical box.

10. The electrical box of claim 4, wherein the voltage divider is positioned at a corner of the electrical box flush against one of the walls of the electrical box.

11. A lighting system comprising:
   a back panel;
   a plurality of walls each having a first edge that extends out in a substantially orthogonal direction from the back panel;
   a front panel removably disposed along a second opposing edge of each of the walls, the back panel, walls, and front panel defining an interior space;
   a voltage divider comprising:
      an attachment wall having a first opening;
      at least one wire receiving wall having a second opening,
      a top wall; and
      a bottom wall,
         wherein the voltage divider separates a first portion of the interior space from a second portion of the interior space;
   low voltage load wires having a first connector position within the second portion of the interior space; and
   line voltage load wires having a second connector position within the first portion of the interior space,
      wherein the top, bottom, attachment, and wire receiving walls are arranged to form an interior space of the voltage divider, and
      wherein the attachment wall of the voltage divider comprises a flange that extends past a position where the top wall meets the attachment wall.

12. The lighting system of claim 11, wherein the attachment wall of the voltage divider is attached or adjoined to one of the walls of the electrical box at a position to align a knockout of the electrical box with the first opening of the voltage divider.

13. The lighting system of claim 11, wherein the top wall has a third opening.

14. The lighting system of claim 11, wherein the flange comprises an opening to receive a screw or other means to attach or adjoin the voltage divider to the one of the walls of the electrical box.

15. The lighting system of claim 11, wherein the voltage divider is positioned at a corner of the electrical box flush against one of the walls of the electrical box.

16. The lighting system of claim 11, wherein the voltage divider is formed in a triangular or curved shape.

\* \* \* \* \*